(12) United States Patent
Suzuki (10) Patent No.: US 6,995,877 B2
(45) Date of Patent: Feb. 7, 2006

(54) IMAGE READING APPARATUS AND ITS CONTROL METHOD

(75) Inventor: Nobukazu Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 09/834,078

(22) Filed: Apr. 12, 2001

(65) Prior Publication Data

US 2001/0030775 A1 Oct. 18, 2001

(30) Foreign Application Priority Data

Apr. 14, 2000 (JP) .............................. 2000-114177
Apr. 3, 2001 (JP) .............................. 2001-104996

(51) Int. Cl.
*H04N 1/04* (2006.01)
*H04N 1/40* (2006.01)

(52) U.S. Cl. ...................... 358/474; 358/442; 358/496; 358/497; 358/461; 358/444; 358/406

(58) Field of Classification Search ............... 358/475, 358/442, 509, 497, 494, 474, 471, 483, 400, 358/412, 409, 482, 473, 468, 500, 486, 472, 358/1.13, 496, 461, 406, 504, 487, 506, 444, 358/505; 713/300–320, 340, 322, 323, 324, 713/330; 250/208.1, 234–236; 399/211; 382/312, 313, 318, 319, 274; 710/15, 73, 710/17–19, 313
See application file for complete search history.

(56) References Cited

U.S. PATENT DOCUMENTS

| | | | | |
|---|---|---|---|---|
| 5,825,505 A | * | 10/1998 | Toyoda et al. | 358/400 |
| 5,956,158 A | * | 9/1999 | Pinzarrone et al. | 358/474 |
| 5,958,054 A | | 9/1999 | O'Conner | 713/300 |
| 6,105,143 A | | 8/2000 | Kim | 713/324 |
| 6,708,279 B1 | * | 3/2004 | Takenaka | 713/324 |

FOREIGN PATENT DOCUMENTS

| | | |
|---|---|---|
| JP | 61-121647 | 6/1986 |
| JP | A 61-133766 | 6/1986 |
| JP | 05-300309 | 11/1993 |
| JP | 06-284287 | 10/1994 |
| JP | A 10-326128 | 12/1998 |
| JP | A 11-119868 | 4/1999 |

* cited by examiner

Primary Examiner—Cheukfan Lee
(74) Attorney, Agent, or Firm—Morgan & Finnegan, LLP

(57) ABSTRACT

In order to appropriately control consumption power in an image reading apparatus which operates based on electric power supplied from a computer via a connection cable or an external power supply, when the external power supply is connected, a read operation is executed in a normal mode; when no external power supply is connected, a read operation is executed in a power saving mode.

10 Claims, 10 Drawing Sheets

IMAGE READING APPARATUS AND ITS CONTROL METHOD

FIELD OF THE INVENTION

The present invention relates to an image reading apparatus and its control method and, more particularly, to an image reading apparatus having a plurality of operation modes that require different consumption powers and its control method.

BACKGROUND OF THE INVENTION

As an image reading apparatus connected to an external apparatus such as a computer or the like when it is used, an image reading apparatus, which operates using electric power supplied from a power supply of the external apparatus via a connection cable such as a USB cable or the like, or using electric power supplied from an AC power supply, is known.

When such image reading apparatus operates using electric power supplied from a power supply of an external apparatus, it may often fail to operate normally due to insufficient electric power. This problem is posed when electric power supplied from the external apparatus via the connection cable is smaller than peak electric power that the image reading apparatus requires. Thus problem readily occurs when the external apparatus is driven using a battery. This is because the battery equipped in the external apparatus normally guarantees the operation of only the external apparatus itself.

SUMMARY OF THE INVENTION

The present invention has been made in consideration of the aforementioned problems, and has as its object to appropriately control consumption power in correspondence with the power supply used.

An image reading apparatus according to the first aspect of the present invention is an image reading apparatus having a plurality of operation modes that require different consumption powers, comprising a power supply controller for supplying electric power to internal units of the apparatus by selectively using at least two power supplies, and an operation mode determination unit for determining one of the plurality of operation modes in accordance with the power supply that the power supply controller uses.

The image reading apparatus according to the first aspect of the present invention preferably further comprises, e.g., an interface for connecting to an external apparatus via a cable having a communication function and power supply function, and the at least two power supplies include a power supply of the external apparatus which can be used via the cable, and another power supply.

In the image reading apparatus according to the first aspect of the present invention, for example, the other power supply is preferably a commercial power supply.

In the image reading apparatus according to the first aspect of the present invention, the operation mode determination unit preferably selects, e.g., a power saving mode as the operation mode when the power supply controller uses the power supply of the external apparatus.

The image reading apparatus according to the first aspect of the present invention preferably further comprises, e.g., an illumination device for illuminating a document upon reading a document image, and electric power for driving the illumination device in the power saving mode is set to be smaller than another mode.

The image reading apparatus according to the first aspect of the present invention preferably further comprises, e.g., an illumination device for illuminating a document upon reading a document image, and a photoelectric conversion element, and electric power for driving the illumination device in the power saving mode is set to be smaller than another mode and an image sensing time of the photoelectric conversion element in the power saving mode is set to be longer than the other mode.

The image reading apparatus according to the first aspect of the present invention preferably further comprises, e.g., a feed unit for feeding a document upon reading a document image, and a feed speed of the document by the feed unit in the power saving mode is set to be lower than another mode.

The image reading apparatus according to the first aspect of the present invention preferably further comprises a scanning unit for scanning the illumination device and the photoelectric conversion element upon reading a document image, and a scanning speed of the illumination device and the photoelectric conversion element by the scanning unit in the power saving mode is set to be lower than another mode.

The image reading apparatus according to the first aspect of the present invention further comprises a sensor for reading a document image while illuminating a document, and electric power for driving the sensor in the power saving mode is set to be lower than another mode. The image reading apparatus preferably further comprises a scanning unit for feeding the sensor upon reading the document image, and wherein a scanning speed of the sensor by the scanning unit in the power saving mode is set to be lower than another mode.

The image reading apparatus according to the first aspect of the present invention preferably further comprises a scanning unit for optically scanning a document upon document scan, and a scanning speed of the scanning unit in the power saving mode is suppressed compared to the other mode.

The image reading apparatus according to the first aspect of the present invention preferably further comprising a scanning unit for optically scanning a document upon reading a document image, and wherein a scanning speed of the scanning unit in the power saving mode is set to be lower than another mode.

The image reading apparatus according to the first aspect of the present invention preferably further comprises a calibration controller for executing calibration in accordance with a change in power supply that the power supply controller uses.

An image reading apparatus according to the second aspect of the present invention is an image reading apparatus comprising a power supply controller for supplying electric power to internal units of the apparatus by selectively using at least two power supplies, and notification means for notifying an external apparatus of information indicating the power supply that the power supply controller uses. The image reading apparatus is controlled by a control signal from the external apparatus. The control signal is generated by the external apparatus based on the notified information.

In the image reading apparatus according to the second aspect of the present invention further comprises an interface for connecting to the external apparatus via a cable having a communication function and power supply function, and the notification means notifies the external apparatus of the information via said interface and the at least two power supplies include a power supply of the external apparatus which can be used via the cable, and another power supply.

In the image reading apparatus according to the second aspect of the present invention, the notification means notifies the external apparatus of information indicating that power supply used by said power supply controller is changed.

An image reading system according to the third aspect of the present invention is an image reading system having a plurality of operation modes that require different consumption powers, comprising a system controller for controlling the image reading system, an image reader having an illumination device for illuminating a document and photoelectric conversion element for performing photoelectric conversion on light from the document, a power supply controller for supplying electric power by selectively using at least two power supplies, and an operation mode determination unit for determining one of the plurality of operation modes in accordance with the power supply that the power supply controller uses.

A control method of an image reading apparatus according to the fourth aspect of the present invention is a control method for an image reading apparatus having a power supply control circuit for supplying electric power to internal units thereof by selectively using at least two power supplies, comprising the operation mode determination step of determining one of a plurality of operation modes that require different consumption powers in accordance with the power supply that the power supply control circuit uses.

A memory medium according to the fifth aspect of the present invention is a memory medium which stores a program for controlling an image reading apparatus having a power supply control circuit for supplying electric power to internal units thereof by selectively using at least two power supplies, and the program comprises the operation mode determination step of determining one of a plurality of operation modes that require different consumption powers in accordance with the power supply that the power supply control circuit uses.

A program according to the sixth aspect of the present invention is a program for controlling an image reading apparatus having a power supply control circuit for supplying electric power to internal units thereof by selectively using at least two power supplies, comprising the operation mode determination step of determining one of a plurality of operation modes that require different consumption powers in accordance with the power supply that the power supply control circuit uses.

A peripheral device according to the seventh aspect of the present invention is a peripheral device having a plurality of operation modes that require different consumption powers, and an interface for connecting to a computer via a cable having a communication function and power supply function, comprising a power supply controller for supplying electric power to internal units of the device by selectively using a power supply supplied via the cable and another power supply, and an operation mode determination unit for determining one of the plurality of operation modes in accordance with the power supply that the power supply controller uses.

A peripheral device according to the eighth aspect of the present invention is A peripheral device having a plurality of operation modes that require different consumption powers, and an interface for connecting to a computer via a cable having a communication function and power supply function, comprising a power supply controller for supplying electric power to internal units of the device by selectively using a power supply supplied via the cable and another power supply, and notification means for notifying the computer of information indicating the power supply that the power supply controller uses. The peripheral device is controlled by a control signal from the computer, the control signal being generated by the computer based on the notified information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described hereinafter with reference to the accompanying drawings.

[First Embodiment]

Figure 1:
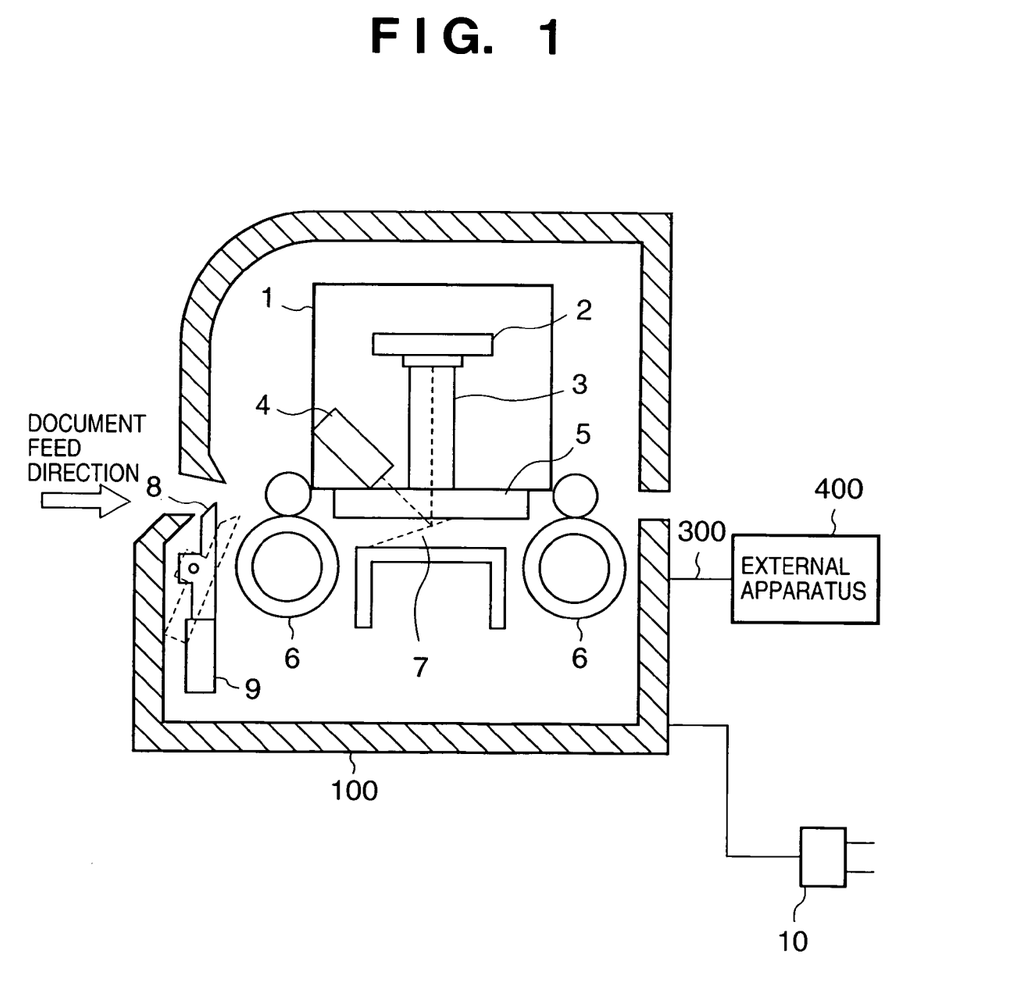
FIG. 1 is a sectional view showing the mechanical arrangement of an image reading apparatus according to a preferred embodiment of the present invention.

FIG. 1 is a sectional view showing the mechanical arrangement of an image reading apparatus according to a preferred embodiment of the present invention. A contact image sensor (CIS) 1 for reading a document image has a photodiode 2, SELFOC lens 3, LED array 4, and contact glass 5. Feed rollers 6 for feeding a document are disposed before and after the CIS 1, and feed a document below the contact glass 5. A contact sheet 7 makes the document contact the lower surface of the contact glass 5. Such system for reading the document image while feeding the document is called a sheet-feed type.

When a document is inserted into a document insert port, a document detect lever 8 tilts, and the output from a document sensor 9 changes in accordance with this tilt. A CPU 215 (to be described later; see FIG. 2) can detect insertion of the document on the basis of the change in output from the document sensor 9. Upon detection of insertion of the document, the CPU 215 controls the CIS 1 to read the document image while driving the document feed rollers 6 by a drive motor (not shown).

This document reading apparatus 100 has a function of obtaining electric power from an external power supply (preferably, a commercial power supply such as an AC power supply or the like) 10 as a power supply other than that of an external apparatus 400 such as a computer or the like, and a function of obtaining electric power from the external apparatus 400 via a connection table (e.g., a USB cable) 300.

Figure 2:
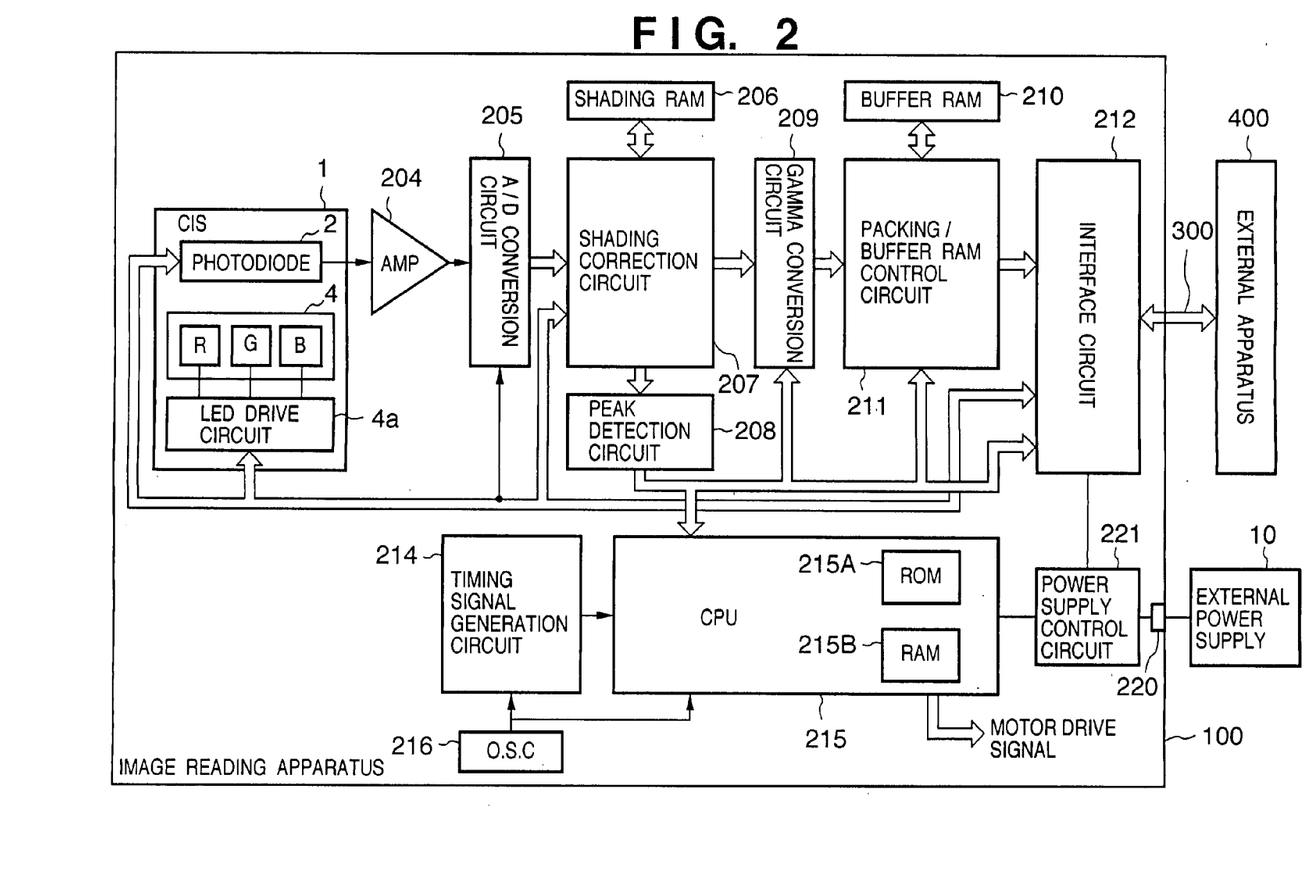
FIG. 2 is a block diagram showing the circuit arrangement of the image reading apparatus according to the preferred embodiment of the present invention.

FIG. 2 is a block diagram showing the circuit arrangement of the image reading apparatus 100 shown in FIG. 1. The CIS 1 has an LED drive circuit 4a for driving (controlling) the LED array 4 in addition to the photodiode 2 and LED array 2 mentioned above. When a document image is read, the LED drive circuit 4a turns on three, R, G, and B LEDs in turn upon reading each line to illuminate a document in accordance with a command from the CPU 215. This illumination light is reflected by the document and enters the photodiode 2, which converts that light into an electrical signal. With this process, R, G, and B line-sequential color read images are obtained.

An AMP (amplifier circuit) 204 amplifies the signals output from the CIS 1, and supplies them to an A/D conversion circuit 205. The A/D conversion circuit 205 converts the signals supplied from the AMP 204 into digital data, and supplies the digital data to a shading correction circuit 207.

A shading PAM 206 stores shading correction data obtained by reading a calibration sheet in the same manner as a document. The shading correction circuit 207 performs shading correction of the read image data of the document on the basis of the data stored in the shading RAM 206. A peak detection circuit 208 detects peak values of the read image data in units of lines, and is used to detect the leading end of the document.

A gamma conversion circuit 209 performs gamma conversion of the read image data in accordance with a gamma curve set by, e.g., the external apparatus 400 such as a computer or the like.

A buffer RAM 210 is a RAM (transmission buffer) for temporarily storing image data to be sent to the external apparatus 400. A packing/buffer RAM control circuit 211 executes a process for executing a-packing process of the read image data in accordance with an image output mode (e.g., binary, 4-bit multi-valued, 8-bit multi-valued, 24-bit multi-valued, and the like) set in advance by the external apparatus 400 or the like, and writing the processed data in the buffer RAM 210, and a process for reading out the read image data written in the buffer RAM 210 and supplying the readout data to an interface circuit 212.

The interface circuit 212 has a communication function of exchanging control information and image data with the external apparatus 400 such as a computer or the like via the connection table 300, and has a function of receiving electric power supplied from the external apparatus 400. For example, a USB interface is preferably used.

A power supply control circuit 221 supplies electric power, which is supplied from the external apparatus 400 via the connection cable 300, to the internal units (building components that require power supply) when the external power supply 10 cannot be used (e.g., when the external power supply 10 is not connected to a plug 220), and supplies electric power to the respective units using the external power supply 10 when it can be used.

The CPU 215 has a ROM 215A that stores a control program, and a RAM 215B serving as a work area, and controls the respective units in accordance with the control program stored in the ROM 215A. The CPU 215 can recognize by, e.g., referring to status of the power supply control circuit 221 if the external power supply 10 is used.

A timing signal generation circuit 214 generates various timing signals by frequency-dividing a periodic signal output from a quartz oscillator 216 in accordance with an instruction from the CPU 215. The CPU 215 controls the timing signal generation circuit 214 in accordance with an operation mode.

Figure 3:
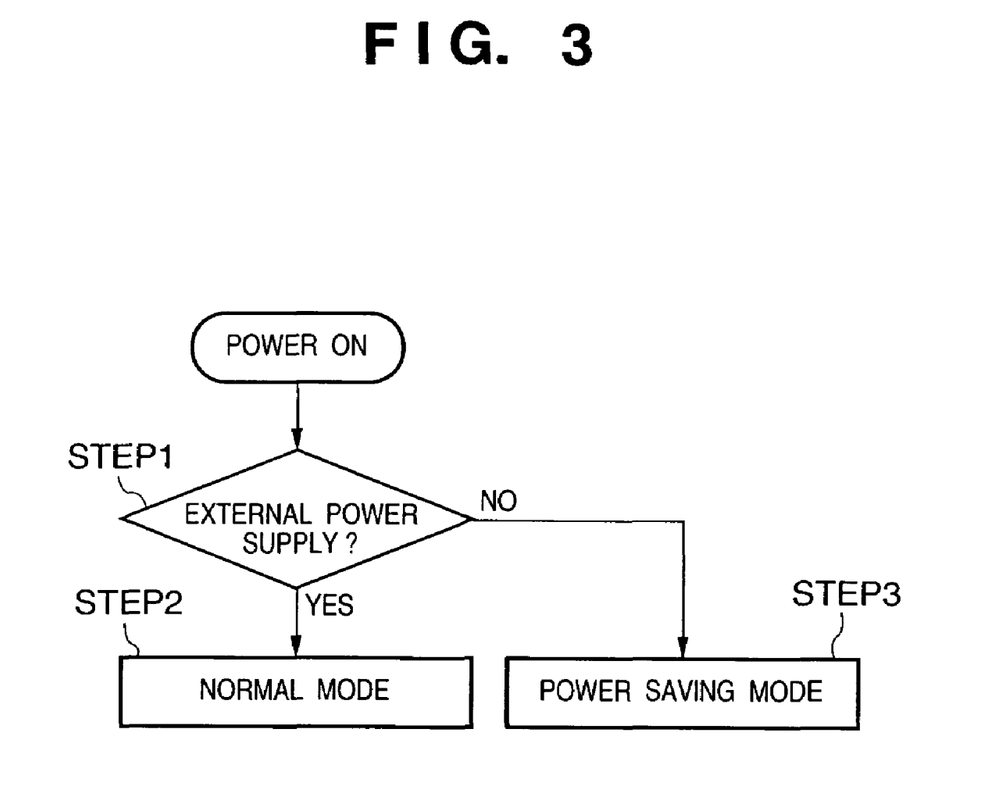
FIG. 3 is a flow chart showing the operation upon setting an operation mode in the image reading apparatus according to the preferred embodiment of the present invention.

FIG. 3 is a flow chart showing the operation of the image reading apparatus according to the preferred embodiment of the present invention shown in FIGS. 1 and 2. Note that this operation is controlled by the CPU 215 on the basis of the control program stored in the ROM 215A. This control program may be externally provided and installed in the image reading apparatus 100. That is, the control program itself also has the industrial applicability. The control program can be distributed while being stored in, e.g., a memory medium, or via a network such as the Internet or the like.

When the power supply is turned on, the CPU 215 refers to status of the power supply control circuit 215 in step S1 to check if the external power supply 10 is used, i.e., if the external power supply 10 is connected to the plug 220 and electric power is supplied from the external power supply 10. If the external power supply 10 is used, the flow advances to step S2; if the external power supply 10 is not used (if electric power supplied from the external apparatus 400 via the connection cable 300 is used), the flow advances to step S3.

In step S2, the read mode is forcibly set in a normal mode. In step S3, the read mode is forcibly set in a power saving mode. In the power saving mode, consumption power (especially, peak power) required in an image read operation or the like is suppressed to reduce the load on the power supply (especially, peak power) of the external apparatus 400. In the power saving mode, for example, the CPU 215 controls the respective units to set a low operation speed of movable portions such as the drive motor (not shown) for driving the feed rollers 6 and the like, and to reduce the amount of light (drive power) of the LED array 4 that illuminates a document. The normal mode is a mode other than the power saving mode.

Note that the power saving mode may suppress consumption power (especially, peak power) in operations other than the image read operation.

In this way, when the image reading apparatus 100 receives electric power supplied from the external apparatus 400 via the connection cable 300, since the operation mode such as the read mode or the like is set in the power saving mode, electric power (especially, peak power) that the image reading apparatus 100 requires can be suppressed. Hence, a problem posed due to insufficient electric power supplied from the external apparatus 400 can be solved.

[Second Embodiment]

The image reading apparatus according to the first embodiment of the present invention is a sheet-feed type image reading apparatus, but the present invention can also be applied to image reading apparatuses other than the sheet-feed type. An image reading apparatus other than the sheet-feed type will be exemplified below.

Figure 4:
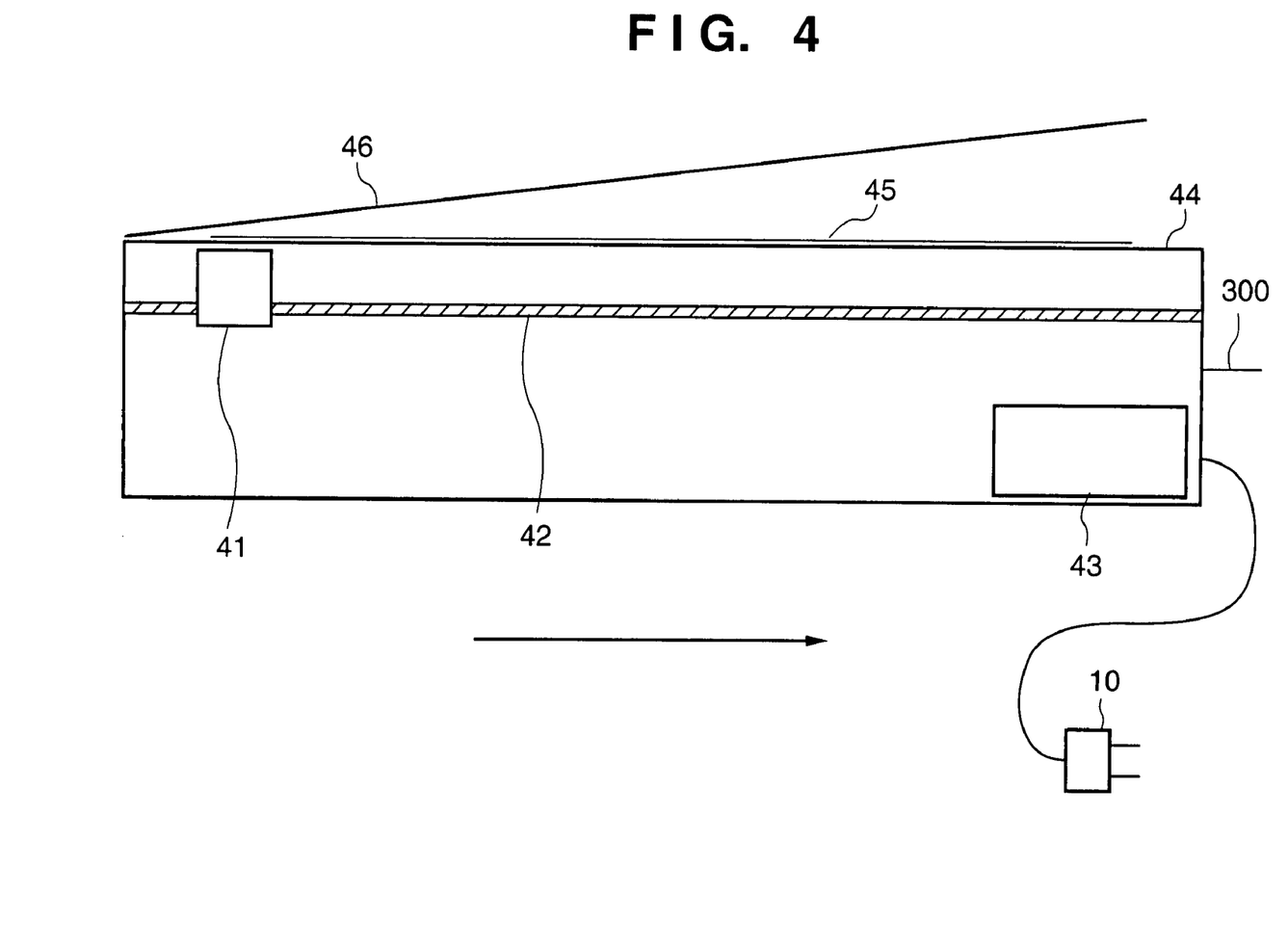
FIG. 4 is a view showing the mechanical arrangement of an image reading apparatus according to the second embodiment of the present invention.

FIG. 4 shows a schematic arrangement of a flatbed-type image reading apparatus according to the second embodiment of the present invention. This image reading apparatus has a CIS 41, shaft 42, motor 43, document table 44, and pressure plate 46. In this image reading apparatus, a document 45 is placed on the document table 44, and its image is read while the CIS 41 is moved by the motor 43 in the direction of an arrow. Note that the arrangement of the control circuit can adopt that shown in FIG. 2. The operation of this embodiment is the same as that shown in FIG. 3.

[Third Embodiment]

Figure 5:
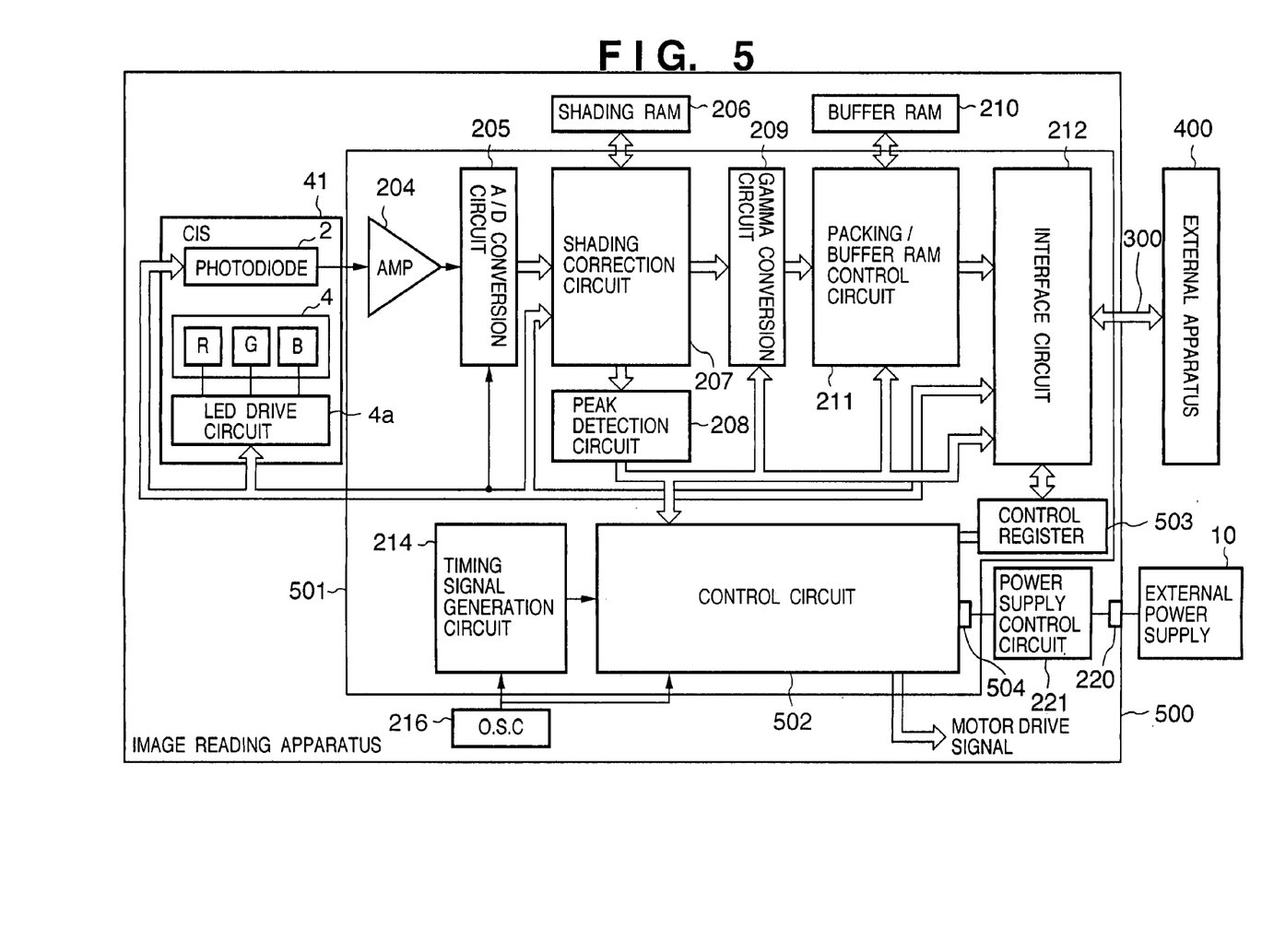
FIG. 5 is a block diagram showing the circuit arrangement of an image reading apparatus according to the third embodiment of the present invention.

FIG. 5 shows the circuit arrangement of a flatbed-type image reading apparatus according to the third embodiment of the present invention. Note that the same reference numerals in FIG. 5 denote the same building components as those of the image reading apparatus shown in FIG. 2.

A document reading apparatus 500 has a function of obtaining electric power from an external power supply (preferably, a commercial power supply such as an AC power supply or the like) 10, and a function of obtaining electric power from an external apparatus 400 such as a computer or the like via a connection table (e.g., a USB cable) 300, as in the first and second embodiments.

The image reading apparatus 500 of this embodiment has a control IC 501, in which an AMP 204, A/D conversion circuit 205, shading correction circuit 207, peak detection circuit 208, gamma conversion circuit 209, packing/buffer RAM control circuit 211, interface circuit 212, timing signal generation circuit 214, control circuit 502, and control register 503 are integrated.

The control IC 501 passes a command to the control circuit 502 by turning on/off corresponding ones of a plurality of control bits of the control register 503 in accordance with a command supplied from the external apparatus 400 via the connection cable 300. The control circuit 502 executes a process in correspondence with the states of the control bits of the control register 503. The external apparatus 400 can confirm the status of the image reading apparatus 500 by reading out the status bits of the control register 503 via the connection cable 300 and interface circuit 212. The control IC has an input port 504 connected to the power supply control circuit 221, and can confirm the status of the power supply control circuit 221 on the basis of a value input to the input port 504. More specifically, the control IC 501 can confirm based on a value input to the input port 504 if the external power supply 10 is used, i.e., if the external power supply 10 is connected to a plug 220 and electric power is supplied from the external power supply 10. Information indicating the status of the power supply control circuit 221 is also written in the status bits of the control register 503 by the control circuit 503, and the external apparatus 400 can recognize the status of the power supply circuit 221 by reading out the status bits via the connection cable 300 and interface circuit 212.

FIGS. 6 to 9 are flow charts showing the operation of the image reading apparatus shown in FIG. 5. FIG. 10 shows a schematic arrangement of the image reading apparatus 500 shown in FIG. 5.

Figure 6:
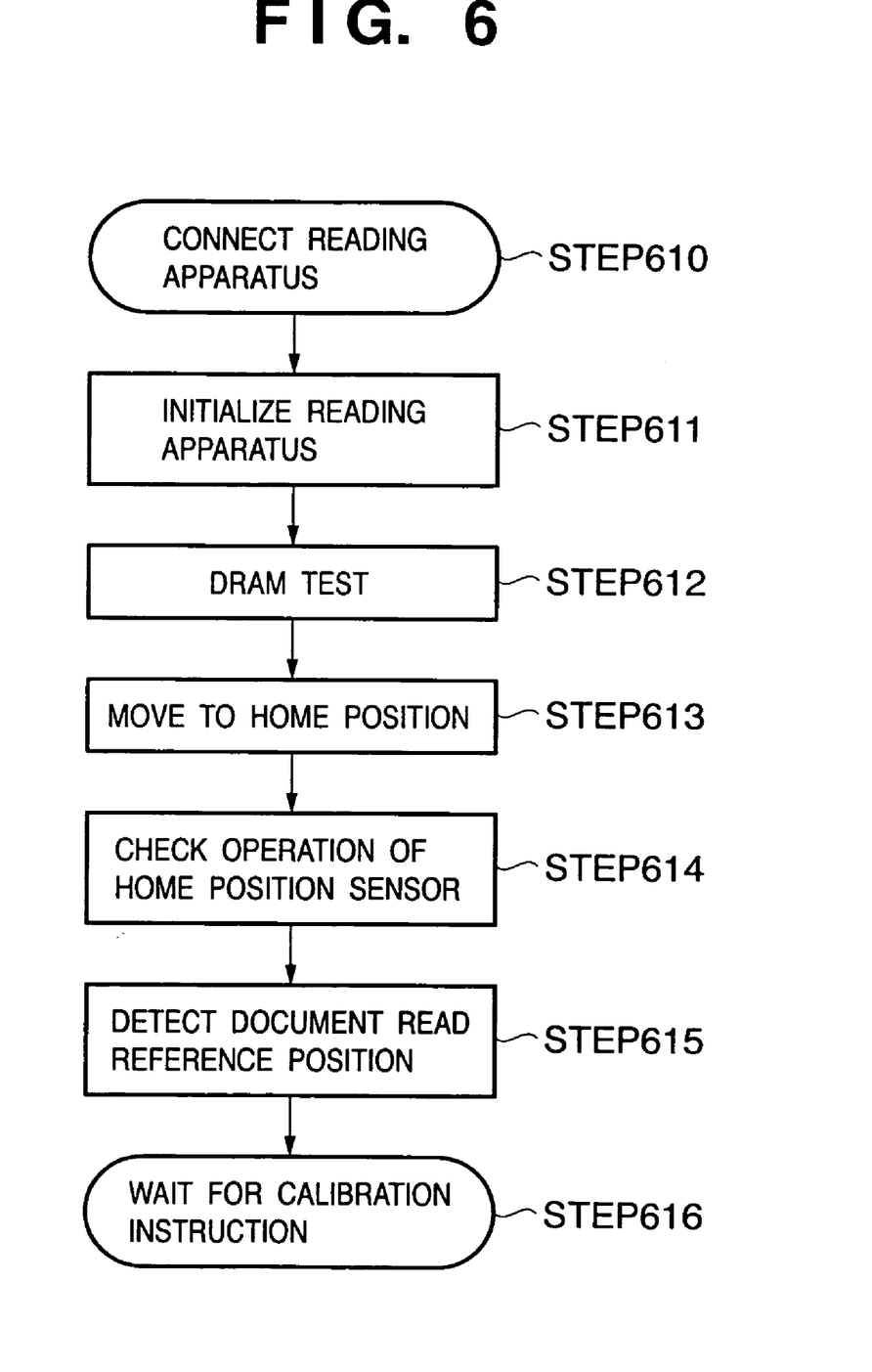
FIGS. 6 to 9 are flow charts showing the operation of the image reading apparatus according to the third embodiment of the present invention.

When the connection cable 300 such as a USB cable or the like is connected to the connector of the interface circuit 212, and the external apparatus 400 such as a computer or the like confirms it, the external apparatus 400 controls execution of processes shown in FIG. 6 in the image reading apparatus 500 (step S610).

In step S611, the external apparatus 400 confirms if it can normally communicate with the image reading apparatus 500 and, after that, a default value is written in the control bits of the control register 503. In step S612, the control IC 501 of the image reading apparatus 500 conducts read/write tests of the buffer RAM 210 and shading RAM 206 in accordance with a command from the external apparatus 400.

In step S613, the control circuit 502 moves the CIS 41 to the home position, as shown in FIG. 10, in accordance with a command from the external apparatus 400. The home position is set outside the image read range, as shown in FIG. 10, and when a projection 48 provided to the CIS 41 intercepts a photointerrupter 47, it is detected that the CIS 41 is located at the home position. In step S614, the control circuit 502 moves the CIS 41 forward to fall outside the home position (to the right in FIG. 10) in accordance with a command from the external apparatus 400 so as to confirm if a home position sensor (47, 48) works correctly. After that, the control circuit 502 moves the CIS 41 backward to the home position.

In this image reading apparatus, a reference plate 50 is set to contact the end portion of a document table glass 52. The reference plate 50 is formed by arranging white and black regions, each of which extend over the full main scan range, in the sub-scan direction. The boundary between the white and black regions corresponds to a document read reference position. The CIS 41 is located at a position corresponding to the black region when it is at its home position. In step S615, the control circuit 502 makes light adjustment of LEDs of the CIS 41 so as not to disturb the read operation of the CIS 41 of the document read reference position, moves the CIS 41 forward, detects the document read reference position as the number of steps of the motor 43, and stores it in accordance with a command from the external apparatus 400. The control circuit 502 turns off the LESs of the CIS 41, returns the CIS 41 to the home position, and ends the detection process of the document read reference position.

Figure 7:
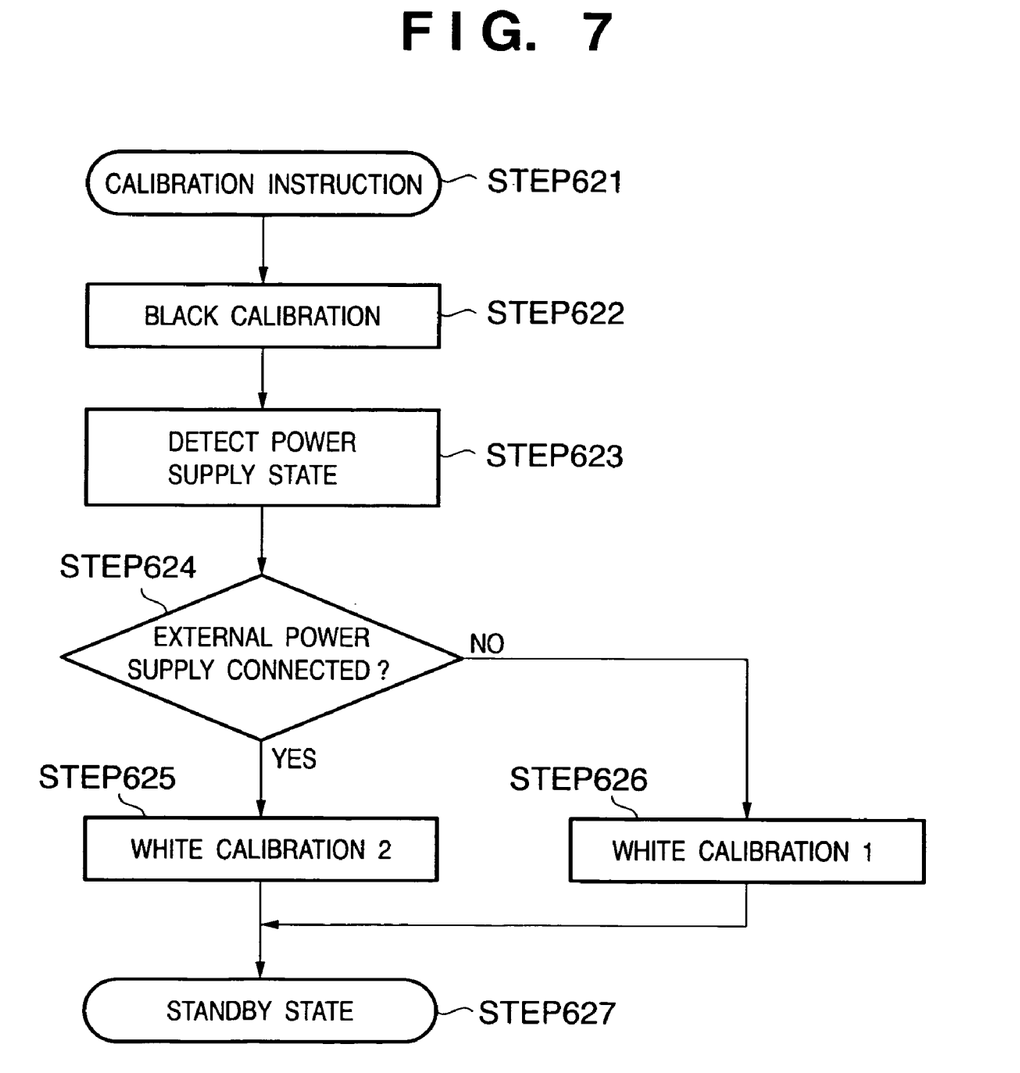

After the processes shown in FIG. 6, a calibration process shown in FIG. 7 is executed in accordance with a calibration instruction from the external apparatus 400 (step S621). In step S622, the control circuit 502 reads the output from the CIS 41 for a plurality of lines while the CIS 41 is located at the home position (a position corresponding to the black region) and the LEDs of the CIS 41 are kept OFF, in accordance with a command from the external apparatus 400. The average value of the read outputs is then stored as black calibration data in the shading RAM 206.

In step S624, the control circuit 502 refers to the status (input port 504) of the power supply control circuit 221 to check if the external power supply 10 is used, i.e., if the external power supply 10 is connected to the plug 220 and electric power is supplied from the external power supply 10. As a result, if the external power supply 10 is used, the flow advances to step S625; if the external power supply 10 is not used (i.e., (if electric power supplied from the external apparatus 400 via the connection cable 300 is used), the flow advances to step S626.

In step S625, the control circuit 502 turns on the LEDs of the CIS 41 with "light amount 2" for the normal mode, moves the CIS 41 to the white region of the reference plate 50, and reads the output from the CIS 41 for a plurality of lines. The control circuit 502 generates "white calibration data 2" on the basis of high-output data of the read data for the plurality of lines, and stores it in the shading RAM 206.

In step S626, the control circuit 502 turns on the LEDs of the CIS 41 with "light amount 1" for the power saving mode, generates "white calibration data 1" by the same method upon generating "white calibration data 2", and stores it in the shading RAM 206.

After generation of "white calibration data 1" or "white calibration data 2", the image reading apparatus 500 shifts to a standby state (step S627). In the standby state, the external apparatus 400 monitors the status bits of the control register 503 constantly or periodically. The calibration data is used in shading correction.

Figure 8:
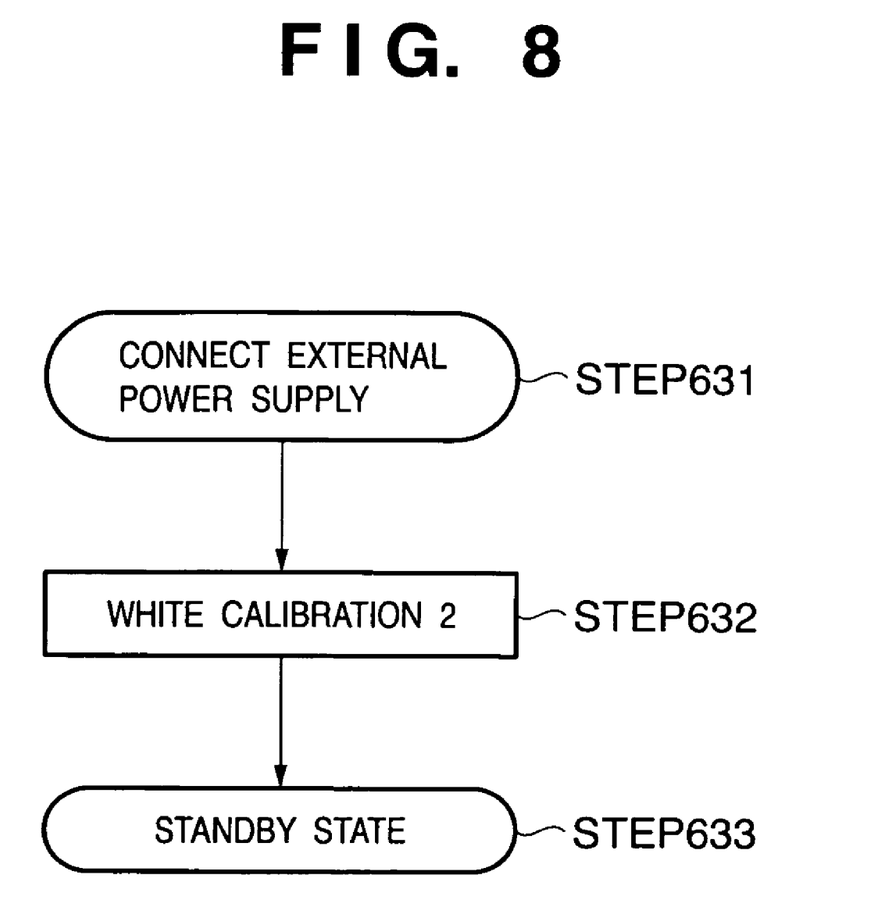

In the standby state, when the status shifts from a state without using the external power supply 10 to a state using the external power supply 10, the process shown in FIG. 8 is executed (step S631). The status shift from the state without using the external power supply 10 to the state using the external power supply 10 is detected since the control circuit 502 monitors the status of the power supply control circuit 221 (input port 504). In step S632, the control circuit 502 turns on the LEDs of the CIS 41 with "light amount 2" for the normal mode, moves the CIS 41 to the white region of the reference plate 50, and reads the output from the CIS 41 for a plurality of lines as in step S625. The control circuit 502 generates "white calibration data 2" on the basis of high-output data of the read data for the plurality of lines, and stores it in the shading RAM 206. In this manner, "white calibration data 2" required for reading an image in the normal mode is prepared. After that, the image reading apparatus shifts to the standby state again.

Figure 9:
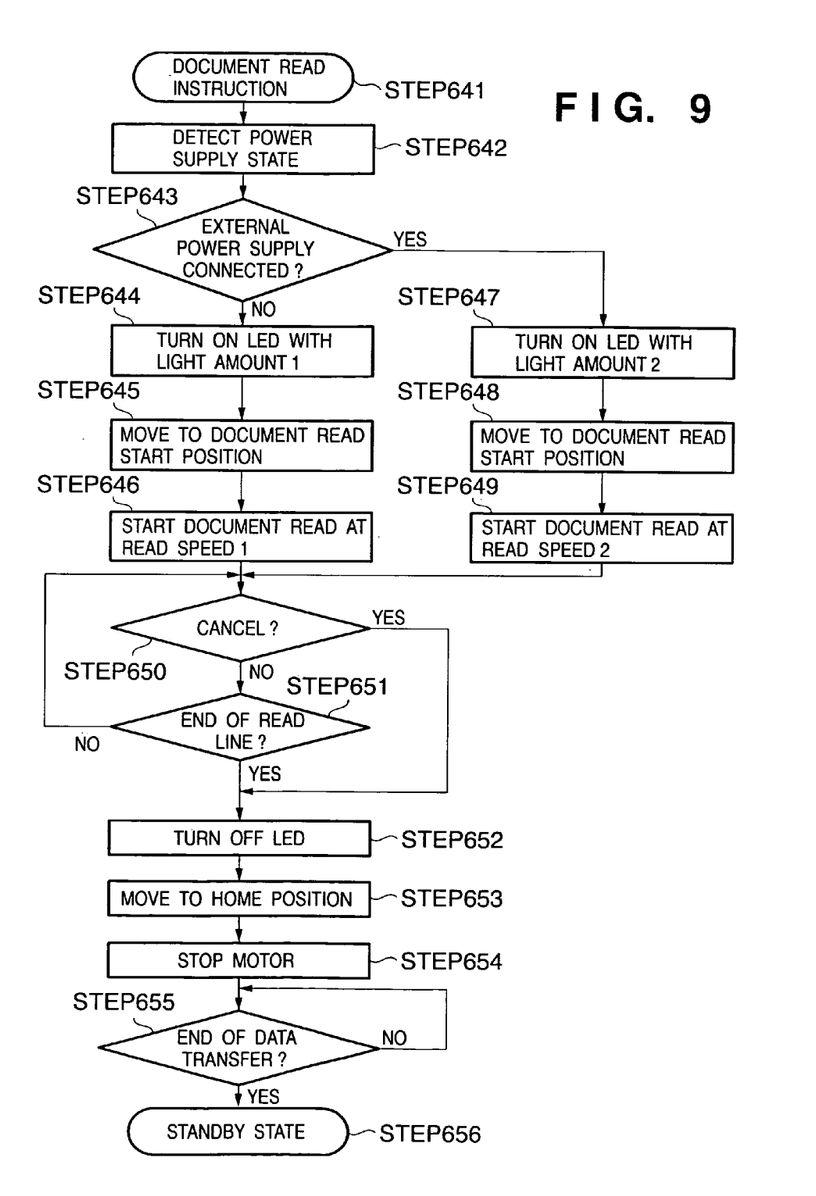
Figure 10:
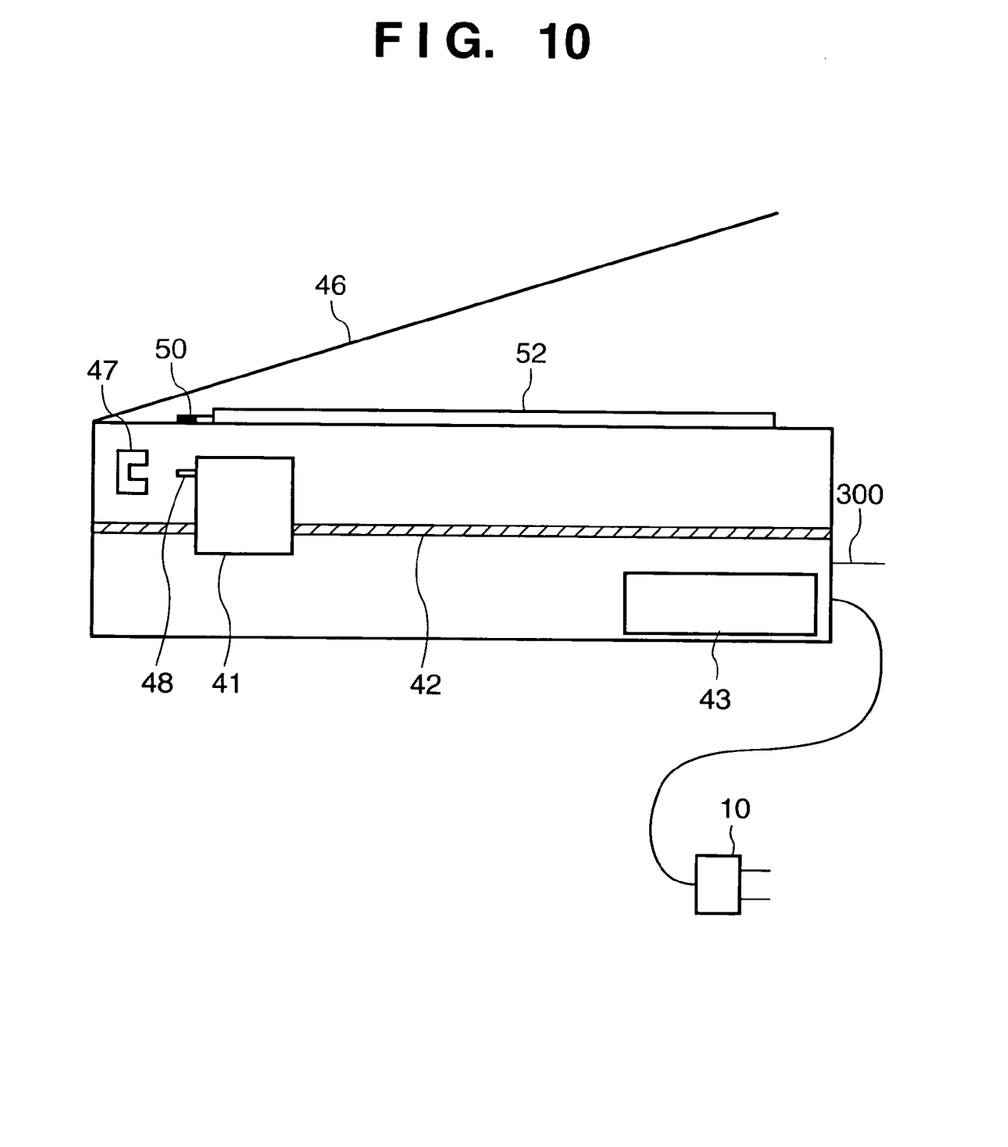
FIG. 10 is a view showing the mechanical arrangement of the image reading apparatus according to the third embodiment of the present invention.

Upon receiving a read instruction from the external apparatus 400 in the standby state, the process shown in FIG. 9 is executed (step S641). In step S642, the control circuit 502 refers to the status (input port 504) of the power supply control circuit 221 to check if the external power supply 10 is used, i.e., if the external power supply 10 is connected to the plug 220 and electric power is supplied from the external power supply 10. If the external power supply 10 is used, the flow advances to step S647; if the external power supply 10 is not used (i.e., (if electric power supplied from the external apparatus 400 via the connection cable 300 is used), the flow advances to step S644. Advancing to step S644 means that an image is read in the power saving mode, and advancing to step S647 means that an image is read in the normal mode.

In the power saving mode (when the external power supply 10 is not used), the control circuit 502 turns on the LEDs of the CIS 41 with "light amount 1" for the power saving mode in step S644, moves the CIS 41 to a document read start reference position in step S645, and starts document read at "read speed 1" for the power saving mode in step S646. In this case, the shading correction circuit 207 executes shading correction of A/D-converted read image data using "black calibration data" and "white calibration data 1" stored in the shading RAM 206.

On the other hand, in the normal mode (when the external power supply 10 is used), the control circuit 502 turns on the LEDs of the CIS 41 with "light amount 2" for the normal mode in step S647, moves the CIS 41 to a document read start reference position in step S648, and starts document read at "read speed 2" for the normal mode in step S649. In this case, the shading correction circuit 207 executes shading correction of A/D-converted read image data using "black calibration data" and "white calibration data 2" stored in the shading RAM 206. Note that (light amount 1)<(light amount 2), and (read speed 1)<(read speed 2).

Upon receiving a read cancel instruction from the external apparatus 400 or the like during the document read operation, the control circuit 502 cancels read in step S650. If no cancel instruction is input, the document is read to its last line (YES in step S651).

Upon completion of read, the control circuit 502 turns off the LEDs of the CIS 41 in step S652, returns the CIS 41 to the home position in step S653, and stops the motor 43 for driving the CIS 41 in step S654. The read image data undergoes a process designated by the external apparatus 400, and is temporarily saved in the buffer RAM 210. The control circuit 502 transfers the image data temporarily saved in the buffer RAM 210 to the external apparatus 400 via the connection cable 300 in step S655.

The present invention can also be applied to an image reading apparatus in which a document and photoelectric conversion elements are fixed in position, and an illumination device and mirror are scanned. When such image reading apparatus receives electric power supplied from the external apparatus via the connection cable, electric power for driving a scanning unit (e.g., illumination device, mirror, and the like) for optically scanning a document is set to be relatively small to lower a scanning speed; when it receives electric power supplied from a power supply (e.g., a commercial power supply such as an AC power supply or the like) other than that of an external apparatus, electric power for driving the scanning unit is set to be relatively large to higher the scanning speed.

The present invention can be applied to every peripheral devices which are connected to an external apparatus such as a computer or the like via a connection cable having a communication function and power supply function. Such peripheral devices include a hard disk drive, CD-R drive, CD-R/W drive, DVD-RAM drive, video capture, video camera, printer, and the like in addition to an image reading apparatus such as a scanner or the like. For example, when the disk drive receives electric power supplied from the external apparatus via the connection cable, the rotational speed of the disk or cooling fan is set to be relatively low; when it receives electric power supplied from a power supply (e.g., a commercial power supply such as an AC power supply or the like) other than that of an external apparatus, the rotational speed of the disk or cooling fan is set to be relatively high.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

According to the present invention, for example, consumption power can be appropriately controlled in correspondence with the power supply used.

In this manner, a normal image read operation can be prevented from being disturbed.

As many apparently widely different embodiments of the present invention can be made without departing from the spirit and scope thereof, it is to be understood that the invention is not limited to the specific embodiments thereof except as defined in the claims.

What is claimed is:

1. An image reading apparatus, comprising:
an image reader arranged to read an original;
a power supply arranged to supplying electric power to internal units of said apparatus by selectively using at least two power sources; and
an operation mode setting unit arranged to set one of the plurality of operation modes that require different consumption powers, in accordance with the power source that said power supply uses; and
a shading correction unit arranged to perform shading correction of image data obtained by said image reader by using calibration data that corresponds to the operation mode set by said operation mode setting unit.

2. The apparatus according to claim 1, further comprising an interface arranged to be connected to an external apparatus via a cable having a communication function and power supply function, and
wherein the at least two power sources include a power supply of the external apparatus which can be used via the cable, and another power supply.

3. The apparatus according to claim 2, wherein the other power supply is a commercial power supply.

4. The apparatus according to claim 2, wherein said operation mode setting unit selects a power saving mode as the operation mode when said power supply uses the power source of the external apparatus.

5. The apparatus according to claim 4, further comprising an illumination device arranged to illuminate a document upon reading a document image, and wherein electric power for driving said illumination device in the power saving mode is set to be smaller than another mode.

6. The apparatus according to claim 4, further comprising a scanning unit arranged to optically scan a document upon reading a document image, and wherein a scanning speed of said scanning unit in the power saving mode is set to be lower than another mode.

7. The apparatus according to claim 1, further comprising a notification unit arranged to notify an external apparatus of information indicating the power supply that said power supply controller uses.

8. A control method for an image reading apparatus having a power supply arranged to supply electric power to internal units of the apparatus by selectively using at least two power sources, the method comprising:
an operation mode setting step of setting one of a plurality of operation modes that require different consumption powers, in accordance with the power source that the power supply uses; and
a shading correction step of performing shading correction of image data obtained by the image reader by using calibration data that corresponds to the operation mode set in the operation mode setting step.

9. A computer-readable storage medium which stores a program for performing a method of controlling an image reading apparatus having a power supply arranged to supply electric power to internal units of the apparatus by selectively using at least two power sources, the method comprising:
an operation mode setting step of setting one of a plurality of operation modes that require different consumption powers, in accordance with the power source that the power supply uses; and
a shading correction step of performing shading correction of image data obtained by the image reader by using calibration data that corresponds to the operation mode set in the operation mode setting step.

10. A computer program embodied on a computer-readable storage medium for performing a method to control an image reading apparatus having a power supply arranged to supply electric power to internal units of the apparatus by selectively using at least two power sources, the method comprising:
an operation mode setting step of setting one of a plurality of operation modes that require different consumption powers, in accordance with the power source that the power supply uses; and
a shading correction step of performing shading correction of image data obtained by the image reader by using calibration data that corresponds to the operation mode set in the operation mode setting step.

* * * * *